United States Patent Office 3,089,893
Patented May 14, 1963

3,089,893
PHOSPHINYLOXYALKENYL CONTAINING PHOSPHORUS ESTERS
James L. Dever, Arlington, Mass., and Gail H. Birum, Dayton, Ohio, assignors to Monsanto Chemical Company, St. Louis, Mo., a corporation of Delaware
No Drawing. Filed Nov. 25, 1960, Ser. No. 71,419
10 Claims. (Cl. 260—461)

This invention relates to organic phosphorus compounds. More particularly, this invention relates to pentavalent phosphorus ester compounds.

An object of this invention is to provide new and valuable pentavalent phosphorus esters. A more specific object is to provide a new and valuable class of pentavalent phosphorus esters containing phosphinyloxyalkenyl radicals.

Other objects of this invention will become apparent from the description hereinafter given.

According to the present invention, there are provided pentavalent phosphorus esters having the general formula

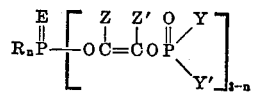

wherein R is selected from the group consisting of hydrocarbyl, hydrocarbyloxy, hydrocarbylthio, halohydrocarbyl, halohydrocarbyloxy, and halohydrocarbylthio radicals which are free from aliphatic unsaturation and have from 1 to 12 carbon atoms, and wherein two R radicals taken together denote a bivalent radical selected from the group consisting of —O-alkylene-O— and —O-arylene-O— radicals having from 2 to 12 carbon atoms and completing with the phosphorus atom a ring having from 2 to 4 carbon atoms; $n$ is a small whole number of from 0 to 2; E is selected from the group consisting of oxygen and sulfur; Z is selected from the group consisting of hydrocarbyl radicals which are free from aliphatic unsaturation and have from 1 to 12 carbon atoms, Z' is selected from the group consisting of Z and hydrogen; Y is selected from the group consisting of hydrocarbyl, hydrocarbyloxy, and halohydrocarbyloxy radicals which are free from aliphatic unsaturation and have from 1 to 12 carbon atoms; Y' is selected from the group consisting of Y, hydrocarbylthio, and halohydrocarbylthio radicals which are free from aliphatic unsaturation and have from 1 to 12 carbon atoms.

These compounds may be generally referred to as phosphinyloxyalkenyl esters of pentavalent phosphorus acids. The phosphinyloxyalkenyl ester radicals in the compounds of this invention represent that portion of the compound having the structure

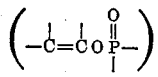

wherein the indicated free valences of the oxygen, carbon, and phosphorus atoms are satisfied as indicated above. Thus, the compounds of this invention are characterized by having a carbon to carbon double bond, and two pentavalent phosphorus atoms. For example,

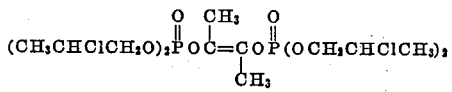

is 2-[bis(2-chloropropoxy)phosphinyloxy]-1-methylpropen-1-yl bis(2-chloropropyl) phosphate; whereas

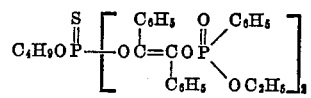

is O,O-bis[2-(ethoxyphenylphosphinyloxy)-1,2-diphenylethenyl] O-butyl phosphorothioate; and

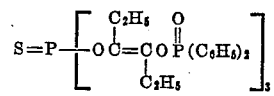

is O,O,O-tris[2-(diphenylphosphinyloxy)-1-ethylbuten-1-yl] phosphorothioate.

Within the definition of the above formula, the term "hydrocarbyl" radical is used to indicate in a generic way radicals such as alkyl, cycloalkyl, and aryl, alkaryl, and aralkyl radicals having from 1 to 12 carbon atoms. The term "halohydrocarbyl" is used to designate those hydrocarbyl radicals having chlorine, bromine, iodine, or fluorine substituents therein, but preferably chlorine or bromine, e.g., chloroalkyl.

The compounds of this invention can be prepared by treating phosphinyloxyalkenyl esters of trivalent phosphorus acid compounds with an oxidizing agent or with sulfur so as to obtain the respective phosphate, phosphonate, or phosphinate when an oxidizing agent is used, and the respective phosphorothioate, phosphonothioate, or phosphinothioate when sulfur is used.

In general, the phosphinyloxyalkenyl esters of trivalent phosphorus compounds which are used as the starting materials for preparing the compounds of this invention may be prepared by reacting a trivalent phosphorus halide compound having from 1 to 3 chlorine or bromine atoms bonded to the phosphorus atom with the 1:1 adduct of certain dicarbonyl compounds and a trivalent phosphorus ester having at least 1 alkoxy or haloalkoxy radical bonded to the phosphorus atom. More specifically, the starting materials used to prepare the compounds of this invention may be prepared according to the following general equation:

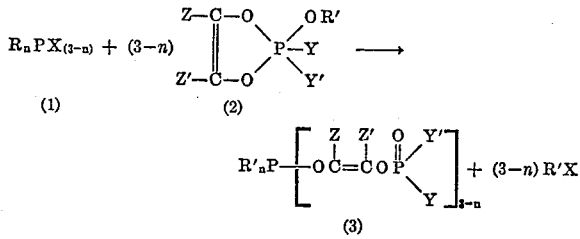

wherein Formula 1 denotes the trivalent phosphorus chloride or bromide reactant, Formula 2 denotes the adduct of a trivalent phosphorus ester and a dicarbonyl compound, and Formula 3 denotes the phosphinyloxyalkenyl ester of the trivalent phosphorus acid which is used as the starting material for preparing a compound within the scope of this invention, and the R, $n$, X, Y, Y', Z, and Z' symbols have the same definitions as indicated above and R' is an alkyl or haloalkyl radical of from 1 to 12 carbon atoms. Thus, for example, by contacting a compound within the scope of Formula 3 above, for example [2 - (diethoxyphosphinyloxy)-1-methylpropen-1-yl] bis(2-chloropropyl) phosphite with an oxidizing agent there is produced a compound within the scope of this invention, namely, [2-(diethoxyphosphinyloxy)-1-methylpropen-1-yl] bis(2-chloropropyl) phosphate. When sulfur is added to the above phosphite, O-[2-(diethoxyphosphinyloxy) - 1 - methylpropen-1-yl] O,O-bis(2-chloropropyl) phosphorothioate is prepared.

As can be seen from the general formula, the possible variation in types of compounds within the scope of this invention which may be prepared is extensive because of the variation and the number of reactants which may be combined to prepare the starting materials used in preparing the compounds of this invention. Since the phosphinyloxyalkenyl esters of the trivalent phosphorus acid compounds used to prepare the compounds of this invention are in turn prepared by reacting a 1:1 adduct with a trivalent phosphorus halide compound as indicated by the above equation, the description of the chemicals useful for preparing the adduct reactant is believed useful.

The 1:1 adduct referred to above as being useful in the preparation of the compounds of this invention is the resulting addition product of a reaction between a trivalent phosphorus ester of the formula

wherein R, Y, and Y' are as defined above, and a dicarbonyl compound of the formula

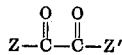

wherein Z and Z' are as defined above. The chemical structure of the resulting adducts were until recently not definitely known. However, it is now believed that the adducts have the cyclic structure of Formula 2 above. But whether the adducts do or do not have the indicated structure of Formula 2 is not essential to this invention. The adduct starting materials are disclosed in U.S. patent application S.N. 763,445, filed September 26, 1958, now U.S. Patent 2,961,455, issued November 22, 1960, which is incorporated herein by reference.

Dicarbonylic compounds, that is, compounds of the formula

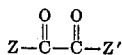

wherein Z and Z' are as defined above, useful for preparing the adduct starting materials includes the α-alkanediones of from 4 to 26 carbon atoms, e.g., 2,3-butanedione, 2,3-pentanedione, 4-methyl-2,3-pentanedione, 3,4-hexanedione, 2,2,5,5-tetramethyl-3,4-hexanedione, 2,3-hexanedione, 5-methyl-2,3-hexanedione, 4,5-octanedione, 2,3-octanedione, 2,7-dimethyl-4,5-octanedione, 3,4-heptanedione, 5,6-decanedione, 3,4-decanedione, 5,6-dodecanedione, 10,11-eicosanedione, 13,14-hexacosanedione, 4-methyl-2,3-decanedione, 2,3-undecanedione, 2-methyl-6,7-octanedione, 3,4-nonanedione, 2,4-dimethyl-3,4-hexanedione, 2-methyl-5,6-heptanedione, 2methyl-3,4-hexanedione, 3-pentanedione, and 11,12-tetracosanedione.

Another valuable class of dicarbonylic compounds which, according to the invention, form 1:1 adducts with the presently disclosed trivalent phosphorus compounds are the aryl- or cycloalkyl-substituted α-alkanediones, e.g., 1-phenyl-1,2-pentanedione, 3,3-dimethyl-1-phenyl-1,2-butanedione, 1-phenyl-1,2-propanedione, 1,3,3-triphenyl-1,2-propanedione, 1,3-diphenyl-1,2-butanedione, 1,4-diphenyl-1,2-butanedione, 3-methyl-1-phenyl-1,2-butanedione, 1-phenyl-1,2-butanedione, 1,4-diphenyl-2,3-butandione, 3,3-dimethyl-(2,4-xylyl)-1,2-butanedione, 1 - mesityl - 3,3-dimethyl-1,2-butanedione, 3 - cyclohexyl-1-phenyl-1,2-propanedione, 1-(3-methylphenyl)-3,4-hexanedione, 1-(β-naphthyl)-8.9-hexadecanedione, and 1-(2,4-dimethylphenyl)-3-phenyl-1,2-propanedione.

Still another class of presently useful α-dicarbonylic compounds includes benzil and the binaphthoyls and their hydrocarbon derivatives, e.g., o-, m- or p-tolyl, 2,2',4,4',5,5'-hexaethylbenzil, 2,4,6 - trimethylbenzil; binaphthoyl 4,4'-dimethylbinaphthoyl, etc.

As hereinbefore disclosed, the dicarbonylic compound may also be an α-ketoaldehyde, i.e., a glyoxal derivative of the formula

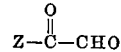

wherein Z is as defined above. Examples of α,β-ketoaldehydes which have the above formula and which react with the trivalent phosphorus acid esters to give the present 1:1 adducts are: pyruvaldehyde, 2-oxobutyraldehyde, 4 - methyl - 2 - oxobutyraldehyde, phenylglyoxal, cyclohexaneglyoxaldehyde, p-methylphenylglyoxal, naphthaleneglyoxaldehyde, cyclopentaneglyoxaldehyde.

Trivalent phosphorus esters having at least one alkoxy or haloalkoxy radical bonded to the trivalent phosphorus atom may be used to form adducts useful for the purposes of this invention. The remaining valences of the trivalent phosphorus atom of the ester may be satisfied by the radicals defined by Y and Y' above because they do not enter the chemical reaction either with the α-dicarbonyl compound to form the adduct or the trivalent phosphorus halide compound with which the adduct is reacted. An especially useful class of trivalent phosphorus esters for preparing the adduct starting materials are the phosphite triesters having at least one alkoxy or haloalkoxy radical bonded to the trivalent phosphorus atom. Examples of such esters are: trimethyl, triethyl, tris(2-chloroethyl), triisopropyl, tris(3,4-dichlorobutyl), tris(3-chloro-2-bromopropyl), tri-n-amyl, tri-n-hexyl, tris(2-ethylhexyl), trinonyl, tridodecyl, 3-bromopropyl diethyl, dimethyl ethyl, butyl diethyl, 6-iodohexyl dipropyl, amyl dioctyl, ethyl methyl propyl, butyl 2-iodoethyl phenyl, ethyl diphenyl, 2-bromopropyl bis(4-chlorophenyl), octyl bis(p-tolyl) undecyl bis(o-ethylphenyl), heptyl dibenzyl, dimethyl pentachlorophenyl, ethyl dinaphthyl, dibutyl phenyl, di-p-tolyl 2-fluoroethyl, tricyclohexyl, 2-chloroethyl dibiphenylyl, tris(4-methylcyclohexyl), and amyl cyclopentyl phenyl phosphites.

Triesters of phosphorothious acid having at least one alkoxy or haloalkoxy radical bonded to the trivalent phosphorus atom may also be reacted with the α-dicarbonylic compound to prepare the adduct starting materials. Examples of such compounds are: diethyl S-ethyl phosphorothioite, bis(2-chloroethyl) S-hexyl phosphorothioite, butyl 2-ethylhexyl S-propyl phosphorothioite S-naphthyl naphthyl butyl phosphorothioite, S-(p-butylphenyl) 8-fluorododecyl ethyl phosphorothioite, di-n-butyl S-cyclohexyl phosphorothioite.

Esters of phosphonous acid having at least one alkoxy or haloalkoxy radical bonded to the phosphorus atom are included within the group of esters useful for preparing adducts which may be used in this invention. Such esters are thus: phosphonite and phosphonothioite compounds, for example, ethyl phenyl phenylphosphonite, diethyl butylphosphonite, 2-chloroethyl 2-ethylhexyl β-naphthylphosphonite, 4-bromobutyl S-methyl p-tolylphosphonothioite, 2-ethylhexyl S-cyclohexyl dodecylphosphonothioite, propyl 2-chloroethyl ethylphosphonamidite, 2,3-dichlorooctyl ethyl phenylphosphonamidite, dibutyl α-naphthylphosphonite, cyclopentyl S-(4-amylphenyl) ethylphosphonothioite, and 4-chlorocyclohexyl S-biphenylyl phenylphosphonothioite.

Esters of phosphinous acid, wherein the one ester radical in the compound is selected from the group consisting of alkoxy and haloalkoxy radicals having from 1 to 12 carbon atoms, likewise, form adducts with the α-diketones described above. Examples of phosphinites useful for this purpose are: methyl dimethylphosphinite, 2-chlorohexyl didodecylphosphinite, butyl diphenylphosphinite, ethyl (ethyl)naphthylphosphinite, cyclohexyl diphenylphosphinite, octyl dibiphenylylphosphinite, 2-bromopropyl bis(2-methylpropyl)phosphinite, etc.

An adduct of the above described type is reacted with a trivalent phosphorus chloride or bromide compound having from 1 to 3 chlorine or bromine atoms bonded to the phosphorus atom with any remaining valences of the phophorus atom being satisfied by radicals defined within the definitions of R above. Examples of phosphorus trihalides that may be used are phosphorus trichloride, phosphorus tribromide, mixed phosphorus bromochlorides.

Examples of phosphorus dihalide compounds that may be used to prepare the compounds of this invention are the phosphono- and phosphorodichloridites and -dibromidites such as ethyl phosphorodibromidite, hexyl phosphorodichloridite, 10,11-dichloroundecyl phosphorodibromidite, 4-fluorobutyl phosphorodichloridite, S-amyl phosphorodichloridothioite, S-(4-bromohexyl) phosphorodibromidothioite, 2,4,5-trichlorophenyl phosphorodibromidite, S-(p-tolyl) phosphorodichloridothioite, cyclohexyl phosphorodibromidite, phenyl phosphorodichloridite, 2-ethylhexyl phosphorodibromidite, α-naphthyl phosphorodichloridite, biphenylyl phosphorodibromidite, butylphosphonodichloridite, 12-iododecylphosphonodibromidite, 4-bromo-2-chlorohexylphosphonodichloridite, cumylphosphonodibromidite, 4-fluorophenylphosphonodichloridite, p-tolylphosphonodibromidite, etc.

Phosphoro-, phosphono, and phosphinomonochloridites and -bromidites may also be used in the reaction with the adduct to prepare the compounds of this invention. Examples of phosphoromonochlorido- and monobromidites that may be used are: diethyl phosphorochloridite, diphenyl phosphorobromidite, bis(2-chloropropyl) phosphorochloridite, bis(cyclohexyl) phosphorochloridite, bis-(p-tolyl) phosphorobromidite, ethyl hexyl phosphorochloridite, butyl 2-bromobutyl phosphorobromidite, 4-chlorophenyl naphthyl phosphorochloridite, biphenylyl amyl phosphorobromidite, 4-iodooctyl m-xylyl phosphorochloridite, 2-chloro-1,3,2-dioxaphospholane, 2-bromo-5-ethyl-5-methyl-1,3,2-dioxaphosphorinane, 2-chloro-4-methyl-1,3,2-dioxaphosphepane, propyl benzyl phosphorochloridite, S-(2,4,5-trichlorophenyl) ethyl phosphorochloridothioite, S-propyl S-hexyl phosphorochloridothioite, S-napththyl S-(2-fluoroethyl) phosphorobromidodithioite, etc.

Examples of phosphonomonochloridites and -monobromidites that may be used are: ethyl phenylphosphonochloridite, butyl octylphosphonobromidite, 4-amylphenyl (2-chloropropyl)phosphonochloridite, naphthylthio phenylphosphonochloridite, hexyl methylphosphonochloridite, decyl 4-iodophenylphosphonobromidite, S-heptyl biphenylylphosphonochloridothioite, etc.

Examples of phosphinomonochloridites and -monobromidites that may be used are: dimethylphosphinochloridite, bis(3-bromobutyl)phosphinobromidite, dihexylphosphinochloridite, diphenylphosphinochloridite, bis(4-chloro-α-naphthyl)phosphinochloridite, p-tolylbutylphosphinobromidite, cyclopentylethylphosphinochloridite, etc.

When an adduct and a phosphorus halide of the above defined types are reacted, a reaction takes place wherein the trivalent phosphorus halide reactant gives up one chlorine or bromine atom for each adduct molecule which becomes attached thereto and the adduct gives up one alkyl or haloalkyl radical. The chlorine or bromine atoms given up by the trivalent phosphorus halide reactant and the alkyl or haloalkyl radical given up by the adduct combine to form an alkyl or haloalkyl chloride or bromide which is a by-product. The products produced by this reaction are the subject matter of copending application Serial No. 71,418, filed November 25, 1960, which is incorporated herein by reference.

A few examples of phosphinyloxyalkenyl ester derivatives of trivalent phosphorus acids which are obtained by reacting a 1:1 adduct of trivalent phosphorus ester having at least one alkoxy or haloalkoxy radical bonded to the phosphorus atom and an α-dicarbonyl compound with a trivalent phosphorus halide as stated above are given to illustrate the types of trivalent phosphorus ester compounds which are used as the starting materials in this invention. These are:

2-[2-butoxybutylphosphinyloxy)-1-propylpenten-1-yloxy]-4,5-benzo-1,3,2-dioxaphospholane is obtained by reacting 2-chloro-4,5-benzo-1,3,2-dioxaphospholane with a 1:1 adduct of dibutyl butylphosphonite and 4,5-octanedione;

2-(ethoxyphenoxyphosphinyloxy) - 1,2 - bis(p-methylphenyl) ethenyl S,S-bis(2-chloroethyl) phosphorodithioite by reacting S,S-bis(2-chloroethyl) phosphorochloridodithioite with a 1:1 adduct of diethyl phenyl phosphite and 4,4-dimethylbenzil;

Bis{2-[bis(2-chloro-3 - bromopropoxy)phosphinyloxy]-1-hexylocten-1-yl} 2-chloro-3-bromopropyl phosphite obtained by reacting 2-chloro-3-bromopropyl phosphorodibromidite with two moles of 1:1 adduct of tris(2-chloro-3-bromopropyl) phosphite and 7,8-tetradecanedione;

Bis[2-(dinaphthylphosphinyloxy)-1-ethylbuten - 1 - yl] S-dodecyl phosphorothioite obtained by reacting S-dodecyl phosphorodichloridothioite with two moles of a 1:1 adduct of ethyl dinaphthylphosphinite and 3,4-hexanedione;

Tris[2-(dipropoxyphosphinyloxy)-1,2-di(p-tolyl)ethenyl] phosphite obtained by reacting phosphorus trichloride with three moles of a 1:1 adduct of tripropyl phosphite and 4,4'-dimethylbenzil;

2-[bis(4 - iodophenoxy)phosphinyloxy]-1-phenylhexen-1-yl S,S-diethyl phosphorodithioite, and its isomer 2-[bis-(4-iododophenoxy)phosphinyloxy]-1-butyl-2 - phenylethenyl] S,S-diethyl phosphorodithioite, obtained by reacting S,S-diethyl phosphorochloridodithioite with one mole of a 1:1 adduct of bis(4-iodophenyl)ethyl phosphite and 1-phenyl-1,2-hexanedione; and 2 - [2 - chloropropoxy)phenylphosphinyloxy] - 1-naphthylethenyl bis(2-bromoethyl) phosphite and its isomer 2-[2-chloropropoxy)phenylphosphinyloxy] - 2 - naphthylethenyl bis(2-bromoethyl) phosphite, obtained by reacting bis(2-bromoethyl) phosphorochloridite with one mole of a 1:1 adduct of propyl 2-chloropropyl phenylphosphonite and naphthaleneglyoxaldehyde.

When a phosphite, phosphonite, and phosphinite compound of the above defined type containing one phosphinyloxyalkenyl ester radical is treated with an oxidizing agent or with sulfur, there is obtained the respective phosphate, phosphonate, or phosphinate when an oxidizing agent is used, and the respective phosphorothioate, phosphonothioate, or phosphinothioate when sulfur is used, for example.

2-{2-[bis(2-chloropropoxy)phosphinyloxy] - 1 - methylpropen-1-yloxy}-5,5-dipropyl-1,3,2 - dioxaphosphorinane to obtain the respective 2-oxo- or 2-thio-2-{2-[bis(2-chloropropoxy)-phosphinyloxy] - 1-methylpropen - 1-yloxy}-5,5-dipropyl-1,3,2-dioxaphosphorinane;

2-[2--(phenoxyphenylthiophosphinyloxy)-1 - butylethenyloxy]-4-methyl-1,3,2-dioxaphospholane and its isomer 2-[2 - (phenoxyphenylthiophosphinyloxy)hexen-1-yloxy]-4-methyl-1,3,2-dioxaphospholane to obtain the respective 2-oxo- or 2-thio-2-[2-(phenoxyphenylthiophosphinyloxy)-1-butylethenyloxy]-4-methyl-1,3,2-dioxaphospholane and its isomer 2-oxa- or 2-thio-2-[2-(phenoxyphenylthiophosphinyloxy)hexen-1-yloxy]-4-methyl-1,3,2-dioxaphosphorinane;

2 - [bis(6 - fluorohexyloxy)phosphinyloxy]1-dodecyltetradecen-1-yl bis(2-chloropropyl) phosphite to obtain the respective 2-[bis(6-fluorohexyloxy)phosphinyloxy]-1-dodecyltetradecen-1-yl bis(2-chloropropyl) phosphate or phosphorothioate;

2 - (di - β-naphthylphosphinyloxy)-1-methylpropen-1-yl diethyl phosphite to obtain the respective 2-(di-β-naphthylphosphinyloxy) - 1 - methylpropen-1-yl diethyl phosphate or phosphorothioate;

2 -[(2-chlorobutyl)butoxyphosphinyloxy]-1-ethylbuten-1-yl dimesityl phosphite to obtain the respective 2-[(2-chlorobutyl)butoxyphosphinyloxy] - 1 - ethylbuten-1-yl dimesityl phosphate or phosphorothioate;

2-[(2-chlorobutyl)butoxyphosphinyloxy]-1-ethylbuten-1-yl ethyl phenylphosphonite to obtain the respective 2-[bis(2 - chloroethoxy)phosphinyloxy] - 1-ethylbuten-1-yl ethyl phenylphosphonate or phosphonothioate;

2 - (benzyloxybenzylphosphinyloxy) - 1-octyldecen-1-yl 10,11-dichlorododecyl 10,11-dichlorododecylphosphonite to obtain the respective 2-(benzyloxybenzylphosphinyloxy)-1-octyldecen-1-yl 10,11-dichlorododecyl 10,11-dichlorododecylphosphonate or -phosphonothioate;

2 - {2 - [(2-chloropropoxy)ethoxyphosphinyloxy]-1-methylpropen-1-yloxy}-1,3,2-dioxaphospholane to obtain the respective 2-oxo-2-{2-[(2-chloropropoxy)ethoxyphosphinyloxy] - 1 - methylpropen-1-yloxy}-1,3,2-dioxaphospholane when an oxidizing agent is used and 2-thio-2-{2[(2-chloropropoxy)ethoxyphosphinyloxy] - 1 - methylpropen-1-yloxy}-1,3,2-dioxaphospholane when sulfur is used; and 2 - (p - cumyloxy-p-cumylphosphinyloxy)-1,2-bis(2-ethyl-phenyl)ethenyl bis(4-chloro-phenyl)phosphinite to obtain the respective 2-(p-cumyloxy-p-cumylphosphinyloxy) - 1,2-bis(2ethylphenyl)ethenyl bis(4-chlorophenyl)phosphinate or -phosphinothioate.

Examples of products obtained when a mono(phosphinyloxyalkylene) phosphite ester of the above defined type is treated with an oxidizing agent or with sulfur are:

2 - (ethoxyethylthiophosphinyloxy) - 1-ethylbuten-1-yl bis(2-chloropropyl) phosphate or phosphorothioate;

2 - [methoxy(4-bromophenylthio)phosphinyloxy]-1,2-bis(4-methylphenyl)ethenyl dihexyl phosphate or phosphorothioate;

2-oxo- or 2-thio-2-{2-(8-iodoöctyloxy) 2-chloropropylthio)-phosphinyloxy] - 1 - propylpenten-1-yloxy}-4-methyl-1,3,2-dioxaphospholane;

2 - [(2-chloropropoxy)(2-chloropropylthio)phosphinyloxy]-1,2-dinaphthylethenyl cyclohexyl phenylphosphonate, or -phosphonothioate;

2 - [hexyloxy(2-chloroethoxy)phosphinyloxy]-1,2-bis-(2-ethylhexyl)ethenyl dodecyl dodecylphosphonate, or -phosphonothioate;

2 - [propoxy(propylthio)phosphinyloxy] - 1,2-bis(4-methylphenyl)ethenyl 2-chlorophenyl 2-chlorophenylphosphonate or -phosphonothioate;

2 - [(6-chlorohexyloxy)-6-chlorohexylthio)phosphinyloxy]-1,2-bis(2,4,6-trimethylphenyl)ethenyl diphenylphosphinate or -phosphinothioate;

2'- [bis(2,4,5-trichlorophenoxy)phosphinyloxy]-1-hexylocten-1-yl dodecylnaphthylphosphinate, or -phosphinothioate; and 2 - [propoxy(2 - chloroethylthio)phosphinyloxy] - 1-(ethyl)-buten-1-yl bis(4-chlorophenyl)phosphinate, or -phosphinothioate.

Examples of products obtained when a mono(phosphinyloxyalkenyl) ester derived by reacting a trivalent phosphorus monochloride or monobromide with an adduct of a phosphonite ester and a diketone compound are:

2 - (ethoxyphenylphosphinyloxy)-1-hexylocten-1-yl bis-(2-chloroethyl) phosphate or phosphorothioate;

2 - [(2-bromopropoxy)cyclobutylphosphinyloxy]-1,2-bis-(4-methylphenyl)ethenyl hexyl S-hexyl phosphorothioate or phosphorodithioate;

2 - oxo- or 2-thio-2{2-[phenoxy(4-cumyl)phosphinyloxy]-1-methylpropen-1-yloxy}-1,3,2-dioxaphosphepane;

2 - [p-tolyloxy)(p-tolyl)phosphinyloxy]-1-butylhexen-1-yl diethyl phosphate or phosphorothioate;

2 - [(4 - chloro-α-naphthyloxy)(4-chloro-α-naphthyl)phosphinyloxy]-1-methylpropen-1-yl phenyl ethylphosphonate, or phosphonothioate;

2 - [bromomethoxy)benzphosphinyloxy]-1,2-diphenyl-ethenyl S-phenyl phenylphosphonothioate, or phosphonodithioate;

2 - [(2 - chloroethoxy)biphenylylphosphinyloxy]-1-pentylhepten-1-yl 2-fluorohexyl benzylphosphonate or phosphonothioate;

2 - (pentachlorophenoxypentachlorophenylphosphinyloxy)-1,2-diphenylethenyl bis(pentachlorophenyl)phosphinate or phosphinothioate;

2 - [(cyclopentyloxy)ethylphosphinyloxyl]-1,2-dinaphthylethenyl bis(4-bromobutyl)phosphinate or phosphinothioate; and 2 - [(2 - chloro-3-bromobutoxy)(2-chloro-3-bromobutyl)phosphinyloxy] - 1-ethylbuten-1-yl dibiphenylylphosphinate or diphosphinylthioate Examples of products obtained when a mono(phosphinyloxyalkenyl) ester obtained by reacting a trivalent phosphorus monochloride or monobromide with 1:1 adduct of a phosphinite ester and a diketone are:

2 - [bis(2-chloropropyl)phosphinyloxy]-1-methylpropen-1-yl bis(2-chloropropyl)phosphate or phorphorothioate;

2 - (diphenylphosphinyloxy)-1,2-dicyclohexyl ethenyl dodecyl phenyl phosphate or phosphorothioate;

2-oxo- or 2-thio-2-{2-[bis(4-chloronaphthyl)phosphinyloxy] - 1 - ethylbuten-1-yloxy}-5,5-diethyl-1,3,2-dioxaphosphorinane;

2 - [ethyl(p-cumyl)phosphinyloxy]-1-butylhexen-1-yl ethyl phenylphosphonate or -phosphonothioate;

2 - (cyclohexylphosphinyloxy)-1-methylpropen-1-yl S-(4-chlorobutyl) S-(4-chlorobutyl)phosphonodithioate or -phosphonotrithioate;

2 - (diethylphosphinyloxy)-1,2-dicyclohexylethenyl ethyl ethylphosphonate or -phosphonothioate;

2 - [bis(2-iodoethyl)phosphinyloxy]-1-ethylbuten-1-yl bis(2-iodoethyl)phosphinate or phosphinothioate;

2 - [dedyl(2-chlorophenyl)phosphinyloxy]-1,2-diphenylethenyl diethylphosphinate; and 2-(dihexylphosphinyloxy)-1-propylpenten-1-yl dihexylphosphinate or -phosphinothioate.

When the mono(phosphinyloxyalkenyl) ester starting material is one wherein the adduct has been derived from a trivalent phosphorus ester having the necessary alkoxy or haloalkoxy radical bonded to the phosphorus atom and an unsymmetrical diketone compound, that is, where Z and Z' are different radicals, the product obtained is a mixture of two isomeric compounds having the Z and Z' radicals transposed. A few examples of such compounds are:

2-[bis(2-bromopropoxy)phosphinyloxy] - 1 - hexylbuten-1-yl bis(2-bromopropyl) phosphate or phosphorothioate, and its isomer 2-[bis(2-bromopropoxy)phosphinyloxy]-1-ethylocten-1-yl bis(2-chloropropyl) phosphate or phosphorothioate;

2-oxo or 2-thio-2-[2-(ethoxyphenylphosphinyloxy)-1-phenyl-hexen-1-yloxy]-5,5-dimethyl - 1,3,2 - dioxaphosphorinane and its isomer 2-oxo or 2-thio-2[2-(ethoxyphenylphosphinyloxy)-1-butyl - 2 - phenylethenyloxy]-5,5-dimethyl-1,3,2-dioxaphosphorinane; and 2-[bis(4-chlorophenyl)phosphinyloxy] - 1 - (4-ethylphenyl)-2-butylethenyl S,S-bis(3-chloropropyl) phosphorodithioate, or phosphorotrithioate and its isomer 2-[bis-(4-chlorophenyl)phosphinyloxy] - 1 - butyl - 2 - (4-ethylphenyl)-ethenyl S,S-bis(3-chloropropyl) phosphorodithioate or phosphorotrithioate.

Similarly, when the mono(phosphinylalkenyl) ester starting material is one derived from an adduct of a trivalent phosphorus ester having the necessary alkoxy or haloalkoxy radical bonded to the phosphorus atom and an α-ketoaldehyde, that is, a glyoxal derivative, the starting material, and hence the product of this case is a mixture of two isomeric products. A few examples of such products are:

2-oxo or 2-thio - 2 - [2-(hexyloxyhexylthiophosphinyloxy)-1-propylethenyloxy]-4-hexyl - 1,3,2 - dioxaphosphorinane and its isomer 2-oxo or 2-thio-2-[2-(hexyloxyhexylthiophosphinyloxy)-penten-1-yloxy] - 4 - hexyl-1,3,2-dioxaphosphorinane;

2[(2,2' - dibromobiphenylyloxy)ethylphosphinyloxy]-1-(4-methylphenyl)ethenyl bis(2-chloropropyl) phosphate or phosphorothioate and its isomer 2-[(2,2'-dibromobiphenylyloxy)ethylphosphinyloxy] - 2 - (4-methylphenyl)ethenyl bis(2-chloropropyl) phosphate or phosphorothioate; and 2-[bis(2-iodopropyl)phosphinyloxy] - 1 - cyclopentylethenyl phenyl ethyl phosphate or phosphorothioate, and its isomer 2-[bis(2-iodopropyl)phosphinyloxy] - 2 - cyclopentylethenyl phenyl ethyl phosphate or phosphorothioate.

When a bis(phosphinyloxyalkenyl) phosphite or phosphonite is treated with an oxidizing agent or with sulfur, the respective bis(phosphinyloxyalkenyl) phosphate, phosphonate, phosphorothioate, or phosphonothioate is obtained. Examples of such products obtained are:

Bis[2-(dihexyloxyphosphinyloxy) - 1 - methylpropen-1-yl] dodecyl phosphate or phosphorothioate;

Bis[2-(cyclohexyloxyphenylphosphinyloxy) - 1,2 - diphenylethenyl] 4-chloro-α-naphthyl phosphate or phosphorothioate;

Bis 2-[bis(4-bromophenyl)phosphinyloxy] - 1 - decyldodecen-1-yl S-(2-chloroethyl) phosphorothioate or phosphorodithioate;

B[2-(diethoxyphosphinyloxy) - 1,2 - dicyclohexylethenyl] butylphosphonate or -phosphonothioate;

Bis[2-(hexylthiohexylphosphinyloxy) - 1 - octyldecen-1-yl] 2,4,5-trichlorophenylphosphonate or -phosphonothioate;

Bis[2-(phenoxyphenyl)phosphinyloxy]- 1 - ethylbuten-1-yl p-cumylphosphonate or -phosphonothioate; and Bis 2-[2-chloro-3-bromobutyl)phosphinyloxy]-1,2 bis-(4-methylcyclohexyl ethenyl 2-chloro-3-bromobutylphosphonate or -phosphonothioate.

When the bis(phosphinyloxyalkenyl) ester is one wherein the adduct used is derived from an α-ketoaldehyde compound or an unsymmetrical diketone as above and a trivalent phosphorus ester and such adduct is reacted with a phosphorus dichloride or phosphorus dibromide the trivalent ester starting material and thus the product of this invention is an isomeric mixture of two products wherein the Z and Z' radicals are transposed. For example, when 2-oxo-hexaldehyde is used with triisopropyl phosphite to prepare the adduct starting material, the product with phenylphosphonous dibromide is a mixture of bis[2-(diisopropoxyphosphinyloxy)-1-butylethenyl] phenylphosphonite and its isomer bis[2-(diisopropoxyphosphinyloxy)hexen - 1 - yl] phenylphosphonite which can be treated with an oxidizing agent or with sulfur to obtain the respective bis[2-(diisopropoxyphosphinyloxy) - 1 - butylethenyl] phenylphosphonate and its isomer bis[2-(diisopropoxyphosphinyloxy) - hexen-1-yl] phenylphosphonate when an oxidizing agent is used and bis[2-(diisopropoxyphosphinyloxy) - 1 - butylethenyl] phenylphosphonothioate and its isomer bis[2-(diisopropoxyphosphinyloxy)hexen-1-yl] phenylphosphonothioate, when sulfur is used. When the adduct is derived from an unsymmetrical diketone compound such as, 1-phenyl-1,2-hexane-dione, and a phosphinite ester, say, ethyl diphenylphosphinite, the product obtained with S-dodecyl phosphorodichloridothioite is an isomeric mixture of bis-[2-(diphenylphosphinyloxy) - 1 - phenylhexen-1-yl] S-dodecyl phosphorothioite and its isomer bis[2-(diphenylphosphinyloxy) - 1 - butyl - 2 - phenylethenyl] S-dodecyl phosphorothioite; treating such a starting material with an oxidizing agent or with sulfur results in an isomeric mixture of bis[2-(diphenylphosphinyloxy)-1-phenylhexen-1-yl] S-dodecyl phosphorothioate and its isomer bis-[2-(diphenylphosphinyloxy) - 1 - butyl-2-phenylethenyl] S-dodecyl phosphorothioate when an oxidizing agent is used and an isomeric mixture of bis [2-(diphenylphosphinyloxy)-1-phenylhexen-1-yl] S-dodecyl phosphorodithioate and its isomer bis[2-(diphenylphosphinyloxy)-1-butyl - 2 - phenylethenyl] S-dodecyl phosphorodithioate when sulfur is used. Other examples of compounds of these types are:

Bis[2-(dimethoxyphosphinyloxy) - 1 - octylethenyl] propyl phosphate or phosphorothioate and its isomer bis-[2-(dimethoxyphosphinyloxy)decen-1-yl] propyl phosphate or phosphorothioate;

Bis[2-(naphthylthiophenylphosphinyloxy) - 1 - hexylethenyl] 2-chloropropylphosphonate or -phosphonothioate and its isomer bis[2-(naphthylthiophenylphosphinyloxy)octen-1-yl] 2-chloropropylphosphonate or -phosphonothioate;

Bis{2-[bis(4-chlorophenyl)phosphinyloxy] - 1 - naphthylethenyl}2-chloroethyl phosphate or phosphorothioate and its isomer bis{2-[bis(4-chlorophenyl)phosphinyloxy] - 2 - naphthylethenyl}2-chloroethyl phosphate or -phosphorothioate;

Bis{2 - [bis(2 - bromoethoxy)phosphinyloxy] - 1 - octyldodecen-1-yl} 2-chloroethyl phosphate or phosphorothioate and its isomer bis{2-[bis(2-bromoethoxy)phosphinyloxy] - 1 - decyldecen - 1 - yl} 2 - chloroethylphosphate or phosphorothioate;

Bis[2 - (hexyloxyphenylphosphinyloxy) - 1 - phenylocten-1-yl] butyl phosphate or -phosphorothioate and its isomer bis[2-(hexyloxyphenylphosphinyloxy)-1-hexyl-2-phenyl-ethenyl] butyl phosphate or -phosphorothioate; and Bis{2 - [(2 - chloropropyl)(2 - bromoethyl)phosphinyloxy] - 1 - methylbuten - 1 - yl} (4 - bromophenyl)phosphonate or phosphonothioate and its isomer bis{2-[(2-chloropropyl)(2 - bromoethyl)phosphinyloxy] - 1 - ethyl-2-propen-1-yl} 4-bromophenylphosphonate or phosphonothioate.

When the starting material is a tris(phosphinyloxyalkenyl)phosphite, the product obtained with an oxidizing agent or with sulfur is the respective tris(phosphinyloxyalkenyl) phosphate when an oxidizing agent is used and the respective tris(phosphinyloxyalkenyl) phosphorothioate when sulfur is used. For example, by treating tris-[2 - bis(2 - bis - (2 - chloroethoxy)phosphinyloxy) - 1-ethylbuten-1-yl] phosphite with an oxidizing agent tris 2 - [bis(2 - chloroethoxy)phosphinyloxy] - 1 - ethylbuten-1-yl]phosphate is obtained. When sulphur is used tris 2 - [bis(2 - chloroethoxy)phosphinyloxy] - 1 - ethylbuten-1-yl] phosphorothioate is obtained. Examples of other such products obtained when a tris(phosphinyloxyalkenyl) phosphite is treated with an oxidizing agent or with sulfur are:

Tris [2 - (dihexyloxyphosphinyloxy) - 1 - butylhexen-1-yl] phosphate or phosphorothioate;

Tris{2 - [(2 - phenylethoxy)phenylphosphinyloxy]-1,2-diphenylethenyl} phosphate or phosphorothioate;

Tris{2 - [butyl(2 - chlorophenoxy)phosphinyloxy]-hexylocten-1-yl} phosphate or phosphorothioate;

Tris{2 - [(2 - chloropropoxy)(2-bromopropyl)phosphinyloxy]-1-methylpropen-1-yl} phosphate or phosphorothioate; and Tris{2 - [bis(4 - bromophenyl)phosphinyloxy] - 1 - dodecyltetradecen-1-yl} phosphate or phosphorothioate.

As stated above for the mono- and bis(phosphinyloxyalkenyl) esters, isomeric mixtures of tris(phosphinyloxyalkenyl) phosphates and phosphorothioates are obtained when the starting phosphite was derived from an adduct of an α-ketoaldehyde compound or an unsymmetrical diketone. For example, when phenylglyoxaldehyde is used with triethyl phosphite to prepare the adduct starting material, the product with phosphorus trichloride is a mixture of tris [2-(diethoxyphosphinyloxy)-1-phenylethenyl] phosphite and its isomer tris[2-(diethoxyphosphinyloxy)-2-phenylethenyl]phosphite. Treating such a material with an oxidizing agent or with sulfur results in the formation of the respective tris[2-(diethoxyphosphinyloxy)-1-phenylethenyl] phosphate or phosphorothioate and its isomer tris[2-(diethoxyphosphinyloxy)-2-phenylethenyl] phosphate or phosphorothioate. Likewise, when the trivalent phosphorus ester tris 2-[(2-chloropropoxy)(2-chloropropyl)phosphinyloxy]-1-methoxy-hepten-1-yl phosphite and its isomer tris 2-[(2-chloropropoxy)(2-chloropropyl)-phosphinyloxy]-1-pentylpropen-1-yl phosphite, derived from an unsymmetrical diketone compound, is treated with an oxidizing agent or with sulfur, there is obtained the respective mixture or tris{2-[(2-chloropropoxy)(2-chloropropyl)phosphinyloxy] - 1 - methylheptenyl - 1 - yl} phosphate or phosphorothioate and its isomer tris{2-[(2-chloropropoxy) (2-chloropropyl)phosphinyloxy] - 1-pentylpropen-1-yl} phosphate or phosphorothioate. Other examples of products of these types are:

Tris[2 - (diphenoxyphosphinyloxy) - 1 - cyclohexylethenyl] phosphate or phosphorothioate and its isomer tris[2 - diphenoxyphosphinyloxy) - 2 - cyclohexylethenyl] phosphate or phosphorothioate;

Tris{2 - [(2 - chlorobutoxy)hexylphosphinyloxy] - 1-methylethenyl} phosphate or phosphorothioate and its isomer tris{2 - [(2 - chlorobutoxy)hexylphosphinyloxy]-propen-1-yl} phosphate or phosphorothioate;

Tris{2 - [bis(p-tolyl)phosphinyloxy] - 1 - (p-methylphenyl)ethenyl} phosphate or phosphorothioate and its isomer tris{2 - [bis(p-tolyl)phosphinyloxy] - 2 - (p-methylphenyl)ethenyl} phosphate or phosphorothioate;

Tris{2-[bis(8 - bromodecyloxy)phosphinyloxy]-1-phenyl-buten-1-yl} phosphate or phosphorothioate and its isomer tris{2 - [bis(8 - bromodecyloxy)phosphinyloxy] - 1-ethyl-2-phenylethenyl} phosphate or phosphorothioate;

Tris{2 - [phenyl(2 - chloroethoxy)phosphinyloxy] - 1-octyl-penten-1-yl} phosphate or phosphorothioate and its isomer tris{2 - [phenyl(2 - chloroethoxy)phosphinyloxy]-1-propyldecen-1-yl} phosphate or phosphorothioate; and Tris{2 - [bis(2 - chloropropyl)phosphinyloxy] - 1-phenyl-propen-1-yl} phosphate or phosphorothioate and its isomer tris{2-[bis(2-chloropropyl)phosphinyloxy]-1-methyl-2-phenylethenyl} phosphate or phosphorothioate.

It has been found in accordance with this invention that a number of oxidizing agents will convert the trivalent phosphorous atom of the phosphinyloxyalkenyl ester radical containing phosphite, phosphonite, and phosphinite starting material to the pentavalent state and supply an oxygen atom thereto without disturbing or varying the linkages of that phosphorus atom to the other groups of the molecule. Some of those which are preferred for making the compounds of this invention are the peroxycarboxylic acids, both aromatic and aliphatic, hydroperoxides, hydrogen peroxide, ozone, oxygen and nitrogen oxides such as nitrogen tetroxide. Air may be used but it is not preferred. Although the more common inorganic oxidizing agents such as $KMnO_4$, $CrO_3$, etc. would accomplish the oxidation, they are not desirable for reasons of expense, salt by-product complications, etc. To prepare the phosphorothioates, phosphonothioates and phosphinothioates of this invention, elemental sulfur in any of its known forms is used. It may be in the form of flowers, powder, crystalline, amorphous, etc. In either case, i.e., whether the phosphate, phosphonate, phosphinate, or the phosphorothioate, phosphonothioate, phosphinothioate compounds are being prepared, the respective trivalent phosphorus compound is usually contacted with a stoichiometric quantity or a slight excess of oxidizing agent or sulfur while stirring the mixture, to insure complete reaction. Excess oxidizing agent or sulfur can be removed by known physical means, e.g., filtration, volatilization, extraction, etc.

Reaction between the phosphinyloxyalkenyl radical containing trivalent phosphorus reactants and the oxidizing agent or sulfur can take place at room temperature. However, when using the highly reactive oxidizing agents such as hydrogen peroxide, and ozone it is oftentimes preferred to cool the mixture to, say, —70° C. to 20° C. depending upon which reactants are combined, to control the resulting exothermic reaction. On the other hand, reaction of the respective phosphite, phosphonite, or phosphinite compound with sulfur is usually most practically accomplished by warming the reactants to from 50° C. to 180° C. to insure complete reaction.

The oxidation or thionation of the phosphinyl-oxy-alkenyl ester radical containing phosphite, phosphonite, or phosphinite starting materials is readily conducted in the absence of an inert solvent or catalyst. However, solvents and catalysts may be employed. The use of solvents is particularly advantageous when working with the highly active oxidizing agents or the more viscous phosphorus compounds. Such solvents may be, e.g., benzene, toluene, xylene, dioxane, alkylene halides such as methylene chloride and methylene bromide, hexane, and mixtures thereof. No particular order or method of contacting the reactants need be employed. However, we usually add the oxidizing agent or the sulfur portionwise to the trivalent phosphorus compound to avoid unduly exothermic reactions and waste of reactants.

The compounds of this invention are stable, usually high boiling materials which range from viscid liquids to waxy or crystalline solids. They are advantageously used as plasticizers, functional fluids, and dielectrics. They are useful as biological toxicants in quantities ranging from one to 10,000 parts per million of a diluent depending upon the organism being treated. They are useful as lead scavengers in leaded gasolines in quantities ranging from 0.05 to 10.0 moles per mole of lead in the gasoline. They are useful as flameproofing agents and heat and light stabilizers in many polymeric materials such as urea-formaldehyde, phenolformaldehyde, epoxy, and other oxygen containing resins; in polyester compositions such as polyterephthalate, polyacrylonitrile and polyamide polymers and in condensation products used to make fibers; in polyurethane, polystyrene, and other foam materials; in rubber based emulsion type coatings; as well as in cellulosic and hydrocarbon materials, in quantities ranging from 0.5% to 25.0% or more by weight, depending upon the materials to which they are added. In the higher concentration ranges, say, in concentrations which may be equivalent by weight to the weight of the polymeric material, plasticizing properties will likewise often be demonstrated. They are also useful as gear and lubricant oil and grease additives.

*Example 1*

To a 500 ml. vessel equipped with a stirrer, thermometer, condenser with drying tube, and a dropping funnel there was added 23.5 g. (0.068 mole) of 2-(diethoxyphosphinyloxy)-1-methylpropen-1-yl diethyl phosphite. This was cooled to 15° C., and 6.5 g. (0.068 mole plus 5% excess) of t-butyl hydroperoxide was added dropwise during three minutes. After the addition of about one-half of the hydroperoxide, the temperature rose spontaneously to 100° C. despite ice bath cooling. The remainder was added slowly with cooling, and the product was distilled to give 18.6 g. (75.7% of theory) of 2-(diethoxyphosphinyloxy)-1-methylpropen-1-yl diethyl phosphate, B.P. 140–142° C./0.01 mm., $n_D^{25}$ 1.4380, having the structure

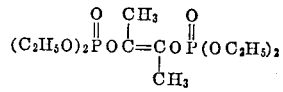

and analyzing as follows:

| Found | Anal.—Calcd. for $C_{12}H_{26}O_8P_2$ |
|---|---|
| Percent C 39.82 | 40.01 |
| Percent H 7.14 | 7.23 |
| Percent P 16.91 | 17.20 |

*Example 2*

To a vessel containing 178.4 g. (0.332 mole) of 2-[bis (2 - chloropropoxy)phosphinyloxy]-1 - methylpropen-1-yl bis(2-chloropropyl) phosphite there was added 7.1 g. of sulfur, and the resulting mixture was stirred and slowly warmed until at 90° C. an exothermic reaction was initiated. The mixture was alternately heated to 130–145°

C. and cooled to 80° C., each time adding small additional amounts of sulfur until no more sulfur reacted. The total amount of sulfur added was 9.1 g. (86% of theory). On cooling there was obtained 187.5 g. consisting largely of 2-[bis(2-chloropropoxy)phosphinyloxy]-1-methylpropen - 1 - yl bis(2 - chloropropyl) phosphorothioate.

Similarly, heating of bis{2-[bis(2-chloroethoxy)phosphinyloxy]-1-methylhexen-1-yl} 2-chloropropyl phosphite with sulfur as above results in the preparation of bis{2-[bis(2-chloroethoxy)phosphinyloxy]-1-methylhexen-1-yl} 2-chloropropyl phosphorothioate.

*Example 3*

To a vessel containing 202.6 g. (0.377 mole) of 2-[bis(2-chloropropoxy)phosphinyloxy]-1-methylpropen-1-yl bis(2-chloropropyl) phosphite 34 g. (0.377 mole) of t-butyl hydroperoxide was added dropwise in 55 minutes at 25°–35° C. using an ice bath for cooling. When the addition was complete, the mixture was stirred and heated to 50° C. to insure complete reaction. The mixture was concentrated to 100° C./0.2 mm. leaving as residue essentially a quantitative yield of 2-[bis(2-chloropropoxy)-phosphinyloxy]-1-methylpropen-1-yl bis(2 - chloropropyl) phosphate.

By operating as above with tris[2-dihexyloxyphosphinyloxy)-1-ethylbuten-1-yl] phosphite, there was produced tris[2 - (dihexyloxyphosphinyloxy) - 1 - ethylbuten-1-yl] phosphate.

*Example 4*

To 114.8 g. (0.279 mole) of 2-{2-[bis(2-chloropropoxy)phosphinyloxy] - 1 - methylpropen-1-yloxy}-1,3,2-dioxaphospholane there was added 7.0 g. of sulfur flowers at room temperature. The mixture was stirred and heated to 140° C. until all of the sulfur had reacted, and then the mixture was alternately cooled to 75° C. at which temperature small amounts of sulfur was added, and then heated to 130° C.–140° C. until all of the sulfur had reacted. A total of 8.5 g. of sulfur was used. On cooling there was obtained a high yield of orange viscous product which was essentially 2-thio-2-{2-[bis(2-chloropropoxy)phosphinyloxy] - 1 - methylpropen - 1 - yloxy}-1,3,2-dioxaphospholane.

*Example 5*

To a vessel containing 51.9 g. (0.145 mole) of 2-[2-(diethoxyphosphinyloxy) - 1 - methylpropen-1-yloxy]-5,5-dimethyl-1,3,2-dioxaphosphorinane there was added 14.0 g. (0.145 mole plus 1 g. excess) of t-butyl hydroperoxide dropwise in ten minutes while cooling in an ice bath. The temperature rose to 56° C. despite ice bath cooling before subsiding. The mixture was stirred and warmed to 60° C. to insure complete reaction. Distillation gave 41.7 g. (77% of theory) of 2-oxo-2-[2-(diethoxyphosphinyloxy)-1-methylpropen-1-yloxy] - 5,5-dimethyl-1,3,2-dioxaphosphorinane, B.P. 182–188° C./0.01–0.15 mm., having the structure,

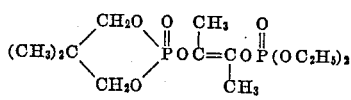

*Example 6*

To a vessel containing 58.9 g. (0.151 mole) of 2-[2-(ethoxyphenylphosphinyloxy) - 1-methylpropen-1-yloxy]-5,5-dimethyl-1,3,2-dioxaphosphorinane there was added 16.0 g. (0.151 mole plus 1.3 g. excess) of t-butyl hydroperoxide dropwise in ten minutes using ice bath cooling. When the addition was completed, the mixture was heated to 70° C. to insure complete reaction. Upon concentrating the mixture to 118° C./0.4 mm. there was obtained as residue 61.7 g. of 2-oxo-2-[2-(ethoxyphenylphosphinyloxy)-1-methylpropen-1-yloxy]-5,5 - dimethyl-1,3,2-dioxaphosphorinane,

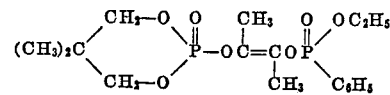

analyzing as follows:

| Found | Anal.—Calcd. for C₁₁H₂₀O₇P₂ |
|---|---|
| Percent C 50.36 | 50.56 |
| Percent H 6.57 | 6.47 |
| Percent P 15.32 | 15.32 |

Operating as above with 2-[2-(diphenylphosphinyloxy)-1-methyl-1-propen-1-yloxy]-5,5-dimethyl-1,3,2 - dioxaphosphorinane, there is obtained 2-oxo-2-[2-(diphenylphosphinyloxy)-1-methylpropen-1-yloxy] - 5,5 - dimethyl-1,3,2-dioxaphosphorinane.

*Example 7*

To a reaction vessel containing 47.5 g. (0.105 mole) of 2-[2-(dimethoxyphosphinyloxy)-1,2 - diphenylethenyloxy]-5,5-dimethyl-1,3,2-dioxaphosphorinane in 150 ml. of benzene, there was added dropwise in 0.2 hour 9.5 g. (0.105 mole) of tert-butyl hydroperoxide while keeping the temperature below 50° C. by cooling when necessary. The mixture was stirred until no further reaction was apparent. Then 100 ml. of hexane was added to cause precipitation of the product. Recrystallization of the precipitate from benzene gave 2-oxo-2-[2-(dimethoxyphosphinyloxy)-1,2-diphenylethenyloxy]-5,5 - dimethyl-1,3,2-dioxaphosphorinane.

We claim:

1. A compound of the formula

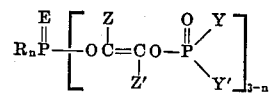

wherein R is selected from the group consisting of hydrocarbyl, hydrocarbyloxy, hydrocarbylthio, halohydrocarbyl, halohydrocarbyloxy, and halohydrocarbylthio radicals which are free from aliphatic unsaturation and have from 1 to 12 carbon atoms, and wherein two R radicals taken together denote a bivalent radical selected from the group consisting of —O-alkylene-O— radicals having from 2 to 12 carbon atoms and —O-arylene-O— radicals having from 6 to 12 carbon atoms and completing with the phosphorus atom a ring having from 2 to 4 carbon atoms; $n$ is a whole number of from 0 to 2; E is selected from the group consisting of oxygen and sulfur; Z is selected from the group consisting of alkyl radicals having from 1 to 12 carbon atoms and aryl radicals having from 6 to 12 carbon atoms; Z′ is selected from the group consisting of Z and hydrogen; Y and Y′ are each selected from alkoxy and haloalkoxy radicals of from 1 to 12 carbon atoms and aryl radicals having from 6 to 12 carbon atoms.

2. A compound according to claim 1, wherein $n$ is 2.
3. A compound according to claim 1, wherein $n$ is 1.
4. A compound according to claim 1 wherein $n$ is 0.
5. A compound according to claim 1 wherein $n$ is 2 and each R radical is a halohydrocarbyloxy radical which is free from aliphatic unsaturation and has from 1 to 12 carbon atoms.
6. A compound according to claim 1 wherein $n$ is 2 and two R radicals are taken together to denote a bivalent radical selected from the group consisting of —O-alkylene-O— radicals having from 2 to 12 carbon atoms and —O-arylene-O— radicals having from 6 to 12 carbon atoms and forming with the phosphorus atom a ring having from 2 to 4 carbon atoms.

7. 2-(diethoxyphosphinyloxy)-1-methylpropen-1-yl diethyl phosphate.

8. 2-[bis(2-chloropropoxy)phosphinyloxy]-1 - methylpropen-1-yl bis(2-chloropropyl) phosphorothioate.

9. 2-thio - 2-{2-[bis(2-chloropropoxy)phosphinyloxy]-1-methylpropen-1-yloxy}-1,3,2-dioxaphospholane.

10. 2-oxo-2-[2-(ethoxyphenylphosphinyloxy)-1 - methylpropen-1-yloxy]-5,5-dimethyl - 1,3,2 - dioxaphosphorinane.

References Cited in the file of this patent

UNITED STATES PATENTS

| | | |
|---|---|---|
| 2,851,478 | Hechenbleikner | July 5, 1956 |
| 2,866,805 | De Witt | Dec. 30, 1958 |
| 3,010,987 | Thompson | Nov. 28, 1961 |

OTHER REFERENCES

Kosolapoff: "Organophosphorus Compounds," 1950, John Wiley and Sons, Inc., New York, New York, pages 231, 235 and 236.